United States Patent [19]

Lecerf et al.

[11] Patent Number: 5,561,006
[45] Date of Patent: Oct. 1, 1996

[54] CHARGEABLE LITHIUM ELECTROCHEMICAL CELL AND METHOD OF MANUFACTING IT

[75] Inventors: André Lecerf, Rennes; Philippe Biensan, Poitiers; Sylvie Baudry, Fontaine Le Comte, all of France

[73] Assignee: SAFT, Romainville, France

[21] Appl. No.: 271,979

[22] Filed: Jul. 8, 1994

[30] Foreign Application Priority Data

Jul. 9, 1993 [FR] France ............................ 93 08484

[51] Int. Cl.$^6$ ........................................... H01M 4/58
[52] U.S. Cl. ..................... 429/218; 429/194; 429/206; 429/207; 429/224; 429/233; 429/60; 429/122; 429/128; 429/129; 423/599; 423/641; 29/623.1
[58] Field of Search ........................... 429/194, 206, 429/207, 218, 224, 233, 60, 122, 128, 129; 423/599, 641; 29/623.1

[56] References Cited

U.S. PATENT DOCUMENTS 5,370,949  12/1994  Davidson et al. ................ 429/224

FOREIGN PATENT DOCUMENTS

| 0265950A1 | 5/1988 | European Pat. Off. . |
| 0370684A1 | 5/1990 | European Pat. Off. . |
| 0413313A2 | 2/1991 | European Pat. Off. . |
| 2251119 | 6/1992 | United Kingdom . |
| WO9111032 | 7/1991 | WIPO . |

OTHER PUBLICATIONS

Tsutomu Ohzuku et al, "LiMnO2 as Cathode for Secondary Lithium Cell", *Chemistry Express*, vol. 7, No. 3, Mar. 1992, pp. 193–196.

J. B. Goodenough, "Manganese Oxides as Battery Cathodes", *Extended Abstracts–Abstract NR 71*, vol. 84, No. 2, Oct. 1984, p. 103.

Tsutomu Ohzuku et al, "Synthesis and Characterization of LixMnO2 for Rechargeable Lithium Cell", *Extended Abstracts—Abstract NR 47*, vol. 90, No. 2, 1990, pp. 74–75. No month available.

M. H. Rossow et al, "Structural Aspects of Lithium–Manganese–Oxide Electrodes for Rechargeable Lithium Batteries", *Material Research Bulletin*, vol. 25, No. 2, 1990, pp. 173–182. No month available.

Tsutomu Ohzuku et al, "Preliminary Results on Synthesis and Characterization of LixMnO2 for Rechargeable Lithium Cell", *Chemistry Express*, vol. 4, No. 12, 1989, pp. 777–780. No month available.

JP-A-05 242 889, Sep. 21, 1993, *Patent Abstracts Of Japan*, vol. 17, No. 698, Dec. 20, 1993.

French Search Report FR 9308484 Apr. 13, 1994.

*Primary Examiner*—Bruce F. Bell
*Attorney, Agent, or Firm*—Sughrue, Mion, Zinn, Macpeak & Seas

[57] ABSTRACT

The present invention consists in a rechargeable cell having an anode made from materials in which lithium can be inserted, a cathode and an electrolyte constituted by a solution of a lithium salt in a non-aqueous solvent. The material of said cathode includes at least one substance which is a yellow-green single-phase oxide of lithium and manganese with an orthorhombic crystal structure with the following lattice parameters: $a=0.459\pm0.004$ nm, $b=0.577\pm0.004$ nm and $c=0.281\pm0.003$ nm and containing lithium ions in a molar ratio Li/Mn such that $0.85 \leq$ Li/Mn $\leq 1.10$. After a first charge said substance is discharged in two stages of which the higher is at a mean voltage greater than 3.5 volts relative to the lithium.

9 Claims, 5 Drawing Sheets

CHARGEABLE LITHIUM ELECTROCHEMICAL CELL AND METHOD OF MANUFACTING IT

The present invention concerns a rechargeable lithium electrochemical cell containing a non-aqueous electrolyte whose performance is improved by using an appropriate cathode. The invention also concerns a method of manufacturing a cell of this kind.

BACKGROUND OF THE INVENTION

The active cathode materials used in rechargeable lithium cells include materials based on lithium manganese dioxide, on which many experiments have been conducted. Some have been found to be unrechargeable or rechargeable to only a small degree, such as $Li_2MnO_3$ and derivatives of $\beta\text{-}MnO_2$ and $\gamma\text{-}MnO_2$. The specific cell capacity decreases rapidly after a few cycles in the case of materials with a spinel structure such as $LiMn_2O_4$, $Li_{1-x}MnO_4$, $Li_{1+x}Mn_2O_4$ (described in U.S. Pat. No. 5,196,279) and $\lambda\text{-}MnO_2$. Nevertheless there are substances with a stable capacity on cycling but having a discharge voltage below 3 volts, such as the substance derived from $\alpha\text{-}MnO_2$ described in French patent 2 644 295 or that derived from $Li_2MnO_3$ described in French patent 6 656 957. The energy per unit volume of cells using these substances is low.

Materials which can be cycled electrochemically having mean discharge voltages above 3.5 volts are known, such as the lithium metal oxides $LiCoO_2$, $LiNiO_2$ and $LiNi_{1-x}Co_xO_2$. The oxides of nickel and cobalt have the disadvantage of being much more costly than manganese dioxide and they are extracted only in hazardous geographical regions.

OBJECTS AND SUMMARY OF THE INVENTION

The present invention is particularly concerned with a rechargeable lithium cell whose energy per unit mass and per unit volume are improved by using a cathode material with a high discharge voltage which is less costly than those known at this time.

The present invention consists in a rechargeable lithium cell having an anode selected from lithium and alloys of lithium, a cathode, and an electrolyte constituted by a solution of a lithium salt in a nonaqueous solvent, wherein the material of said cathode includes at least one substance which is a yellow-green single-phase oxide of lithium and manganese with an orthorhombic crystal structure with the following lattice parameters: $a=0.459\pm0.004$ nm, $b=0.577\pm0.004$ nm and $c=0.281\pm0.003$ nm and containing lithium ions in a molar ratio of Li/Mn such that $0.85 \leq Li/Mn \leq 1.10$, and after a first charge said substance is discharged in two stages of which the higher is at a mean voltage greater than 3.5 volts relative to the lithium.

The molar ratio is preferably such that $0.90 \pm Li/Mn \pm 1.05$.

The substance is yellow-green in color and the valency of the manganese is III ($Mn^{3+}$), which distinguishes it from the brown-black substances described in the literature.

The substance is defined by an X-ray diffraction spectrum whose most intense lines are:

| d (nm) | 0.57 ± 0.01 | 0.360 ± 0.005 | 0.229 ± 0.005 | 0.202 ± 0.005 |
|---|---|---|---|---|
| [hkl] | [010] | [110] | [200] | [021] |

The intensity of the second line [110] is highly sensitive to the value of the molecular ratio Li/Mn. It is in direct proportion to this ratio. It widens when the ratio Li/Mn falls below 0.95.

The cations of the lattice, and the lithium in particular, occupy only the octahedral sites. The tetrahedral sites do not contain any cations.

The anode material is lithium or a lithium alloy, for example an alloy containing up to 20% by weight of aluminium or zinc.

The cathode material is prepared in the discharged state and is charged the first time to a voltage above 4 V/Li, for example 4.3 V/Li. The cathode material in accordance with the invention is subsequently discharged in two stages. For discharge rates of C/20 or below (where C is the capacity of the material discharged in 20 hours), a first stage is at a mean voltage between 3.5 V/Li and 4.5 V/Li, which yields the substance $Li_{0.5}MnO_2$, and the second stage is at a mean voltage between 2.5 V/Li and 3.5 V/Li, which completes the reinsertion of the lithium to yield the substance $Li_xMnO_2$ with x close to 1.

The present invention also consists of a rechargeable lithium cell having an anode material selected from a carbon- and lithium-containing material or a carbon-containing material into which lithium can be inserted, a cathode and an electrolyte including a solution of a lithium salt in a non-aqueous solvent, wherein the material of said cathode includes at least one substance which is a yellow-green single-phase oxide of lithium and manganese with an orthorhombic crystal structure with the following lattice parameters: $a=0.459\pm0.004$ nm, $b=0.577\pm0.004$ nm and $c=0.281\pm0.003$ nm and containing lithium ions in a molar ratio Li/Mn such that $0.85 \leq Li/Mn \leq 1.10$ and after a first charge said substance is discharged in two stages of which the higher is at a mean voltage greater than 3.5 volts relative to the lithium and initially contains a quantity of lithium adapted to be de-inserted on the first charge greater than the quantity of lithium that can be inserted and de-inserted reversibly in subsequent cycles.

This surplus available capacity is advantageously used to compensate for the loss of capacity in the first cycle which can be attributed to the capacity for passivation of the carbon anode. Depending on the type of carbon used, the cycle voltage limits are chosen so that the surplus capacity on the first cycle compensates the loss due to the carbon electrode without requiring excess cathode material. In a storage battery containing a lithium or lithium alloy anode this surplus capacity also has the advantage that it can be used as a top up to make good the loss of lithium due to the poor reversibility of the anode.

After a first cycle the substance has a diffraction diagram whose most intense lines are 0.48±0.01 nm, 0.25±0.01 nm, 0.20±0.01 nm and 0.15±0.01 nm, said first cycle comprising a charge followed by a discharge.

A first charge extracts the lithium initially present in the substance, some of which is re-inserted during the next discharge.

The lines of the electroformed substance, allowing for their intensity, are similar to those observed for an $LiNiO_2$ type hexagonal phase described in JCPDS data sheet 9-63. Some of the synthesized lithium remains in the octahedral sites and helps to stabilize the structure.

The lithium salt is selected from lithium perchlorate $LiClO_4$, lithium hexafluoroarsenate $LiAsF_6$, lithium hexafluorophosphate $LiPF_6$, lithium tetrafluoroborate $LiBF_4$, lithium trifluoromethanesulfonate $LiCF_3SO_3$, lithium trifluoromethanesulfonimide LiN(CF$_3$SO$_2$)$_2$ (LiTFSI) and lithium trifluoromethanesulfonemethide LiC(CF$_3$SO$_2$)$_3$ (LiTFSM) and mixtures thereof.

The non-aqueous solvent is an organic solvent containing a mixture of ethers and/or esters, the latter being selected from propylene carbonate (PC), ethylene carbonate (EC), butylene carbonate (BC), diethyl carbonate (DEC), and dimethyl carbonate (DMC), and mixtures thereof.

The present invention also consists in a method of manufacturing a cell in which the cathode material is obtained as follows.

A mixture is prepared containing an oxide of manganese, Mn$_2$O$_3$ for example, and lithium hydroxide LiOH.(H$_2$O) in a molar ratio Li/Mn such that $0.85 \leq$ Li/Mn $\leq 1.10$.

The mixture is then heat treated in a non-oxidizing atmosphere with the temperature progressively increased to a maximum value between 500° C. and 900° C. The purpose of this progressive heating is to avoid the formation of lithium oxide Li$_2$O which has a very low reactivity. For the same reason this heating must be carried out in the absence of oxygen: nitrogen or any other inert gas may be used but a reducing atmosphere can be used instead, for example a mixture of gases including hydrogen.

The cathode is made as follows:

said material is mixed with a conductive material and a binder selected from polyethylene, its copolymers and its derivatives, said mixture is associated with a current collector and the cathode is inserted into said cell.

In a first embodiment the heat treatment is carried out in an inert atmosphere at 300° C. for two hours and then at 500° C. for three hours and finally at 700° C. for five hours.

In a second embodiment the heat treatment is carried out in an inert atmosphere at 300° C. for two hours and then at 500° C. for three hours and finally at 700° C. for two hours in a reducing atmosphere.

In a third embodiment the heat treatment is carried out in an inert atmosphere at 300° C. for two hours and then at 500° C., initially for one hour in a reducing atmosphere and then for two hours in an inert atmosphere, and finally at 700° C. for two hours in a reducing atmosphere.

BRIEF DESCRIPTION OF THE DRAWINGS

The invention will be better understood and other advantages and features of the invention will emerge from the following description of purely illustrative examples which are not limiting on the invention and are described with reference to the accompanying drawings in which.

MORE DETAILED DESCRIPTION

In FIGS. 3, 6, 7 and 9 the diffraction angle 2θ in degrees is plotted on the abscissa and the percentage relative intensity I/I$_0$ of the spectrum lines is plotted on the ordinate, the line of greatest magnitude representing 100%.

Figure 1:
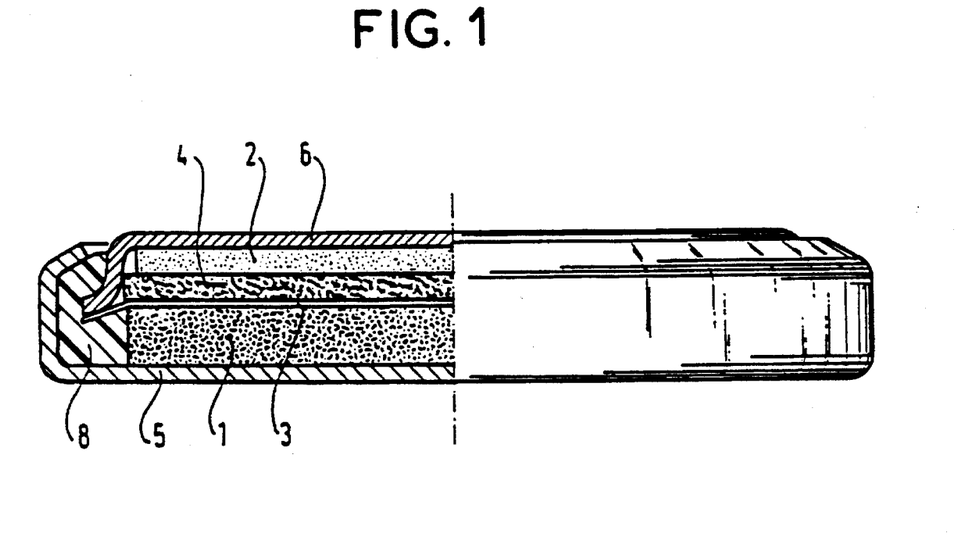
FIG. 1 is a highly diagrammatic half-section view of a button type rechargeable cell.

To experiment with the electrochemical properties of materials in accordance with the invention button type cells were constructed as shown in FIG. 1.

The cathode material was mixed intimately with acetylene black, graphite and polytetrafluoroethylene in the following proportions by weight:

cathode material 80%, acetylene black 7.5%, graphite 7.5%, and polytetrafluoroethylene 5%.

A cathode 1 was made by encrusting an aluminium grid with this mixture. After drying and cutting with an appropriate tool an electrode was obtained in the form of a disc with a diameter of 16 mm and a thickness of around 0.5 mm.

The anode 2 was a lithium disc with a diameter of 20 mm and a mass of around 110 mg.

The electrolyte solvent was a mixture of propylene carbonate, ethylene carbonate and dimethyl carbonate in respective proportions by volume of 20%, 20% and 60%. A solute such as lithium hexafluorophosphate LiPF$_6$, for example, was dissolved in this solvent to a concentration of 1 mole/litre.

The electrodes 1 and 2 were separated by a microporous polypropylene separator 3 and a polypropylene fibre felt reservoir separator 4.

The whole was placed in a casing 5 hermetically sealed by a lid 6 and a gasket 8.

EXAMPLE 1

The prior art substance LiMnO$_2$ was synthesized by the method described in JCPDS data sheet 35-749. The material A obtained was black.

Figure 2:
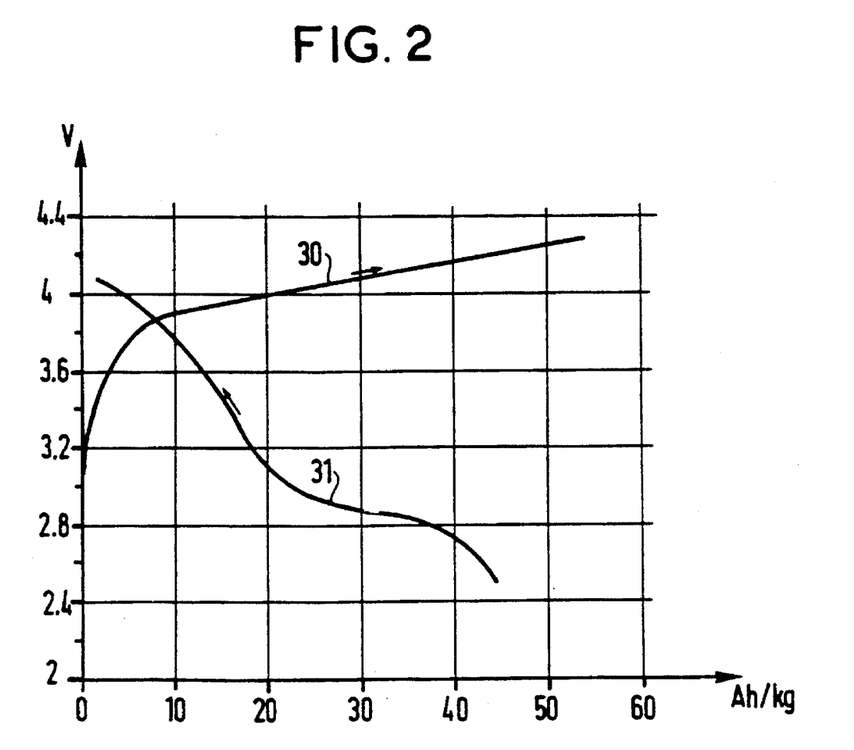
FIG. 2 shows charge and discharge curves for a cell containing the known lithium manganese oxide LiMnO$_2$ prepared by the method described in JCPDS data sheet 35-749, with the voltage V in volts plotted on the ordinate as a function of the specific capacity in Ah/kg of the lithium manganese oxide plotted on the abscissa.

This material A was inserted into a button type storage battery identical to that shown in FIG. 1. This battery was subjected to a cycle I. It was first charged at a current of 0.5 mA to a voltage of 4.3 volts. The battery was then cycled at a constant current of 0.5 mA between voltage limits of 4.3 V and 2.5 V. FIG. 2 shows a charge cycle 30 and a discharge cycle 31 of this battery. The capacity per unit mass discharged in the cycle I was in the order of 40 Ah/kg after around 20 cycles in the case of the material A.

A button type storage battery identical to that shown in FIG. 1 containing the material A was subjected to a cycle II. It was first charged at a current of 0.5 mA to a voltage of 4.3 volts. The battery was then cycled at a constant current of 0.5 mA between voltage limits of 4.3 V and 3.0 V. The capacity per unit mass discharged in the cycle II was in the order of 20 Ah/kg after around 20 cycles in the case of the material A.

EXAMPLE 2

The material B in accordance with the invention was prepared as follows. A mixture was made containing manganese oxide $Mn_2O_3$ obtained by thermolysis in air at 700° C. of the "CMD" type product $MnO_2$ obtained chemically and lithium hydroxide $LiOH.(H_2O)$ in proportions such that the molar ratio Li/Mn was equal to 0.97. The resulting mixture was then ground.

The ground mixture was then heat treated a first time in an inert atmosphere (nitrogen) at 300° C. for two hours and then at 500° C. for three hours, after which the treated mixture was ground again.

Finally the mixture was heat treated a second time at 700° C. for five hours in an inert atmosphere.

Figure 3:
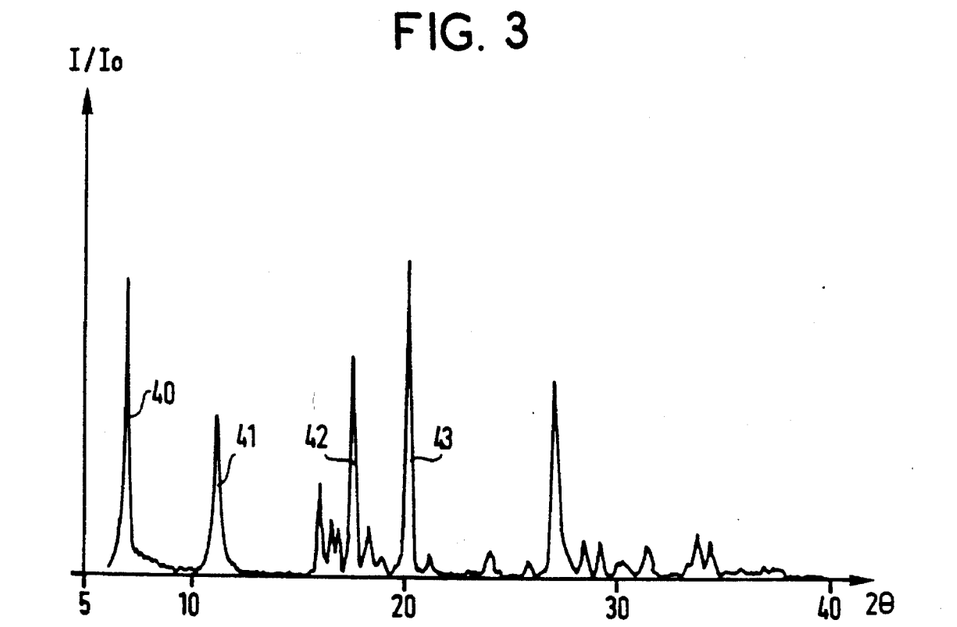
FIG. 3 shows the X-ray diffraction diagram of a substance B in accordance with the invention.

The single-phase material B obtained was green-yellow in color. FIG. 3 shows its diffraction diagram. The first most intense peaks were:

|  | peak 40 | peak 41 | peak 42 | peak 43 |
| --- | --- | --- | --- | --- |
| d (nm) | 0.584 | 0.363 | 0.231 | 0.202 |
| $I/I_0$ (%) | 93 | 51 | 70 | 100 |
| [hkl] | [010] | [110] | [200] | [021] |

Chemical analysis of the material B gave the following results:

composition:7.21% by weight lithium and 59% by weight manganese, oxidation of the manganese:3.0, molecular ratio Li/Mn:0.97.

The formula of this substance was therefore: $Li_{0.97}MnO_{1.99}$.

Figure 4:
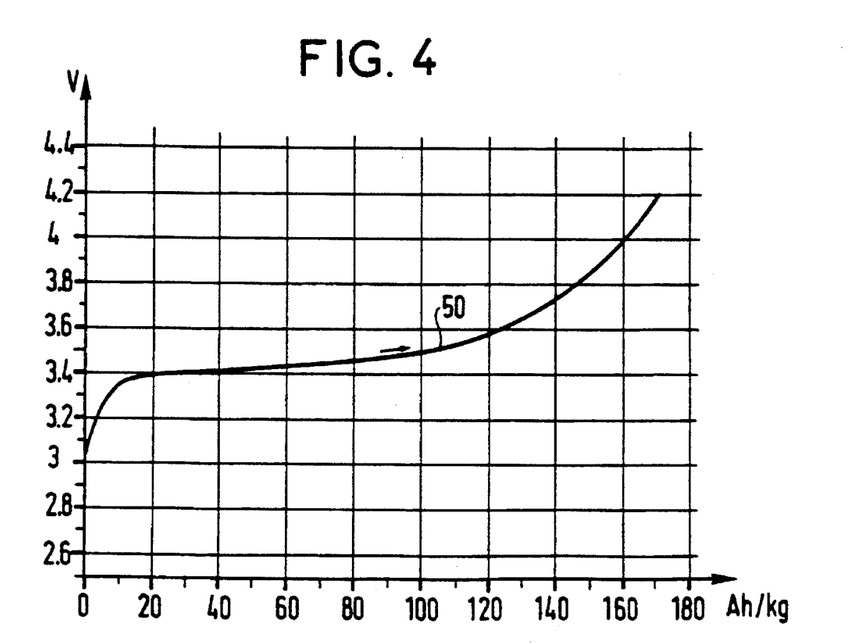
FIG. 4 shows the first charge curve for a cell in accordance with the invention containing the substance B whose diagram is shown in FIG. 3 with the voltage V in volts plotted on the ordinate as a function of the specific capacity in Ah/kg of the substance B plotted on the abscissa.

This material B was inserted into a button type storage battery similar to that shown in FIG. 1 but the electrolyte of which contained lithium trifluoromethane-sulfonimide (LiTFSI) as the solute. This battery underwent a first charge at 0.4 mA to a voltage of 4.2 V. The first charge 50 of this battery, shown in FIG. 4, was at a mean voltage in the order of 3.6 V. The charged capacity was 170 Ah/kg. Under certain conditions, the charged capacity may be as much as 220 Ah/kg, which corresponds to the de-insertion of around 0.8 atoms of lithium per mole, yielding at the end of charging the substance $Li_{0.2}MnO_2$.

Figure 5:
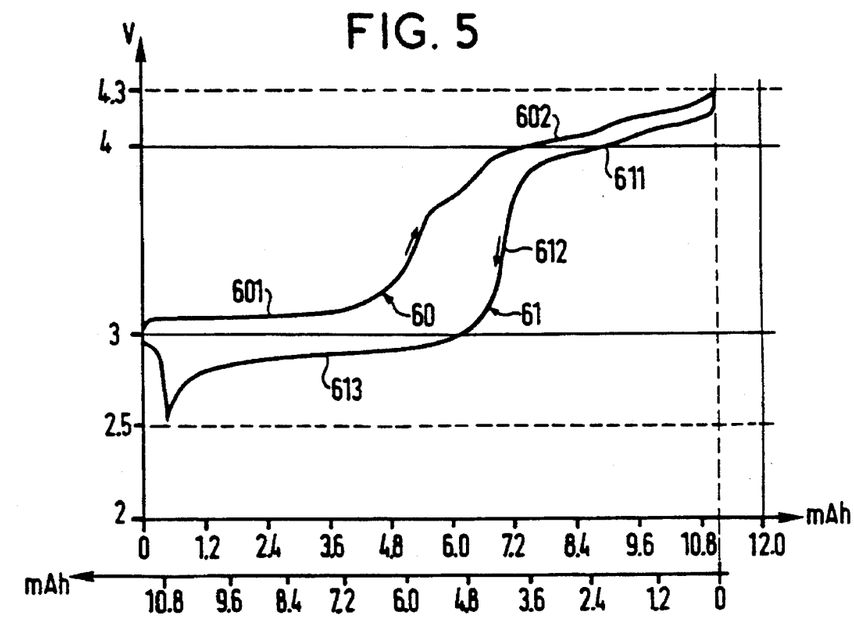
FIG. 5 shows charge and discharge curves for a cell in accordance with the invention containing the substance B whose diagram is shown in FIG. 3 with the voltage V in volts plotted on the ordinate as a function of the capacity in mAh of the cell plotted on the abscissa.

The material B was inserted into a button type storage battery identical to that shown in FIG. 1. This battery was evaluated electrochemically by the cycle I test described in connection with example 1. FIG. 5 shows a charge cycle 60 and a discharge cycle 61 of this battery.

The discharge 61 was effected in two stages: a first stage 611 at a mean voltage of 3.9 V/Li yielded the substance $Li_{0.5}MnO_2$ at the point of inflexion 612, and a second stage 613 around 2.9 V/Li completed the reinsertion of lithium to yield the substance $Li_{0.9}MnO_2$. The second charge 60 had a first stage 601 around 3.10 V and a second stage 602 towards 4.10 V.

The capacity per unit mass discharged in cycle I was in the order of 175 Ah/kg after around 20 cycles in the case of the material B. After more than 60 cycles the capacity was still 175 Ah/kg.

Figure 6:
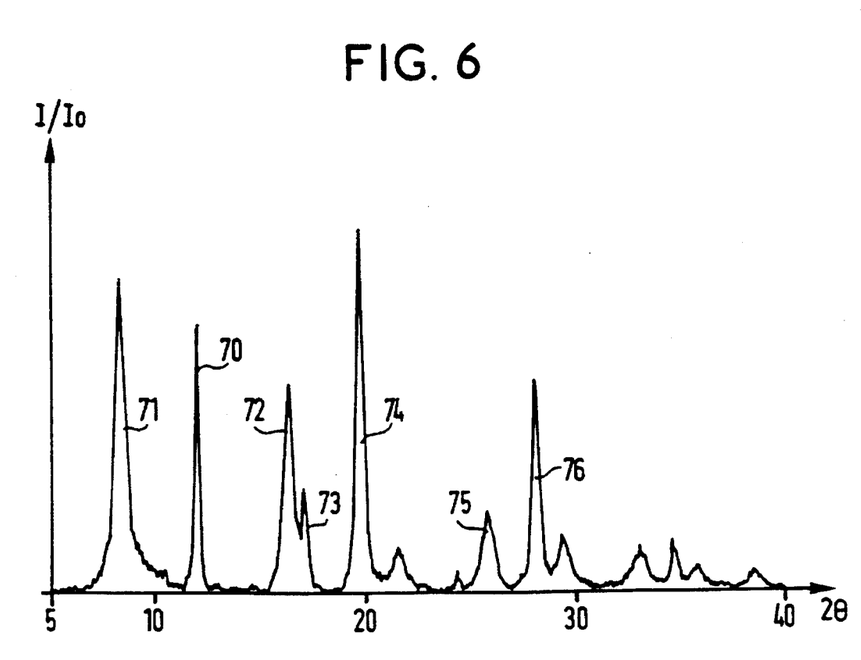
FIG. 6 shows the X-ray diffraction diagram after discharge of a substance B in accordance with the invention whose diagram is shown in FIG. 3.

After the discharge 61 of the material B a material B' was obtained whose X-ray diffraction diagram is shown in FIG. 6. The peak 70 represents the graphite mixed with the material B when manufacturing the cathode.

Comparison of the most intense lines of the diffraction diagrams of the electroformed material B' and the lithium nickel oxide $LiNiO_2$ (JCPDS 9-63), summarized in the table below clearly shows the similarities between the two materials. The few differences for d are due to the substitution of manganese for nickel.

|  | material B' | | $LiNiO_2$ | |
| --- | --- | --- | --- | --- |
| peak | d (nm) | $I/I_0$ (%) | d (nm) | $I/I_0$ (%) |
| 71 | 0.487 | 86 | 0.472 | 100 |
| 72 | 0.251 | 56 | 0.245 | 40 |
| 73 | 0.241 | 29 | 0.235–0.236 | 27 |
| 74 | 0.208 | 100 | 0.204 | 95 |
| 75 | 0.159 | 21 | 0.157 | 20 |
| 76 | 0.146 | 57 | 0.144 | 50 |

EXAMPLE 3

The material C in accordance with the invention was prepared as follows. A mixture was made containing manganese oxide $Mn_2O_3$ obtained by thermolysis in air at 700° C. of the "CMD" type product $MnO_2$ obtained chemically and lithium hydroxide $LiOH.(H_2O)$ in proportions such that the molar ratio Li/Mn was equal to 1.05. The resulting mixture was then ground.

The ground mixture was then heat treated a first time in an inert atmosphere (nitrogen) at 300° C. for two hours and then at 500° C. for three hours, after which the treated mixture was ground again.

Finally the mixture was heat treated a second time at 700° C. for two hours in a reducing atmosphere (nitrogen +10% hydrogen saturated with steam).

Figure 7:
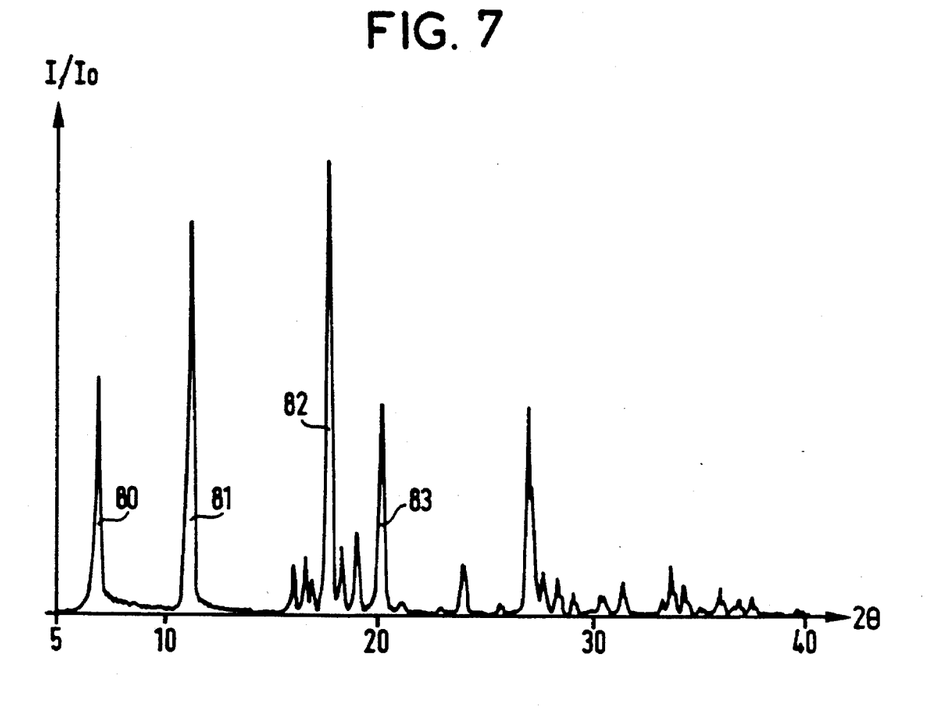
FIG. 7 shows the X-ray diffraction diagram of a substance C in accordance with the invention for a different preparation method.

FIG. 7 shows the diffraction diagram of the material C obtained. The first most intense peaks were:

|  | peak 80 | peak 81 | peak 82 | peak 83 |
| --- | --- | --- | --- | --- |
| d (nm) | 0.587 | 0.363 | 0.231 | 0.202 |
| $I/I_0$ (%) | 51 | 87 | 100 | 48 |
| [hkl] | [010] | [011] | [200] | [021] |

Chemical analysis of the material C gave the following results:

composition:7.71% by weight lithium and 58.4% by weight manganese, oxidation of the manganese:2.99, molecular ratio Li/Mn:1.05.

The formula of this substance was therefore: $Li_{1.05}MnO_{2.02}$.

Figure 8:
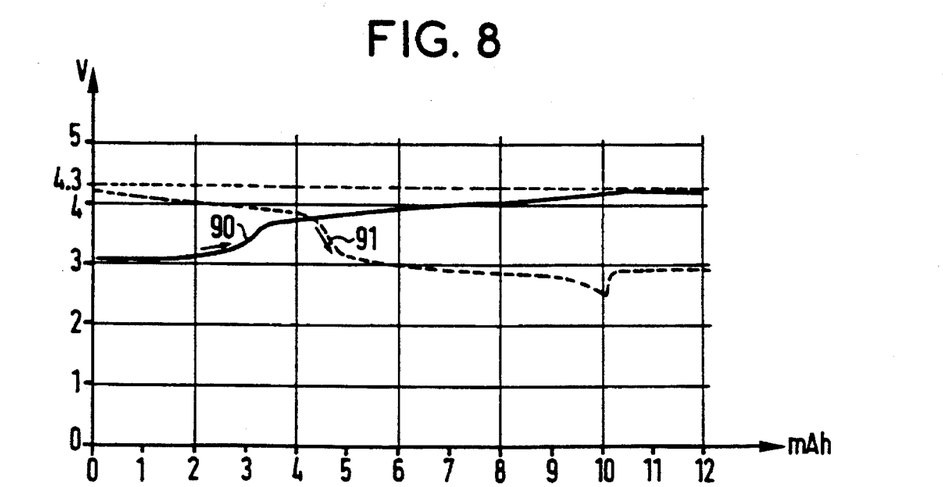
FIG. 8 shows charge and discharge curves for a cell in accordance with the invention containing a substance C whose diagram is shown in FIG. 7 with the voltage V in volts plotted on the ordinate as a function of the capacity in mAh of the cell plotted on the abscissa.

This material C was inserted into a button type storage battery identical to that shown in FIG. 1. This battery was evaluated electrochemically by the cycle I test described in connection with example 1. FIG. 8 shows a charge cycle 90 and a discharge cycle 91 of this battery. 183 Ah/kg ,were charged during the first charge. The mean discharge voltage was 3.3 V. The capacity per unit mass discharged in cycle I was in the order of 110 Ah/kg after around 20 cycles in the case of the material C. After more than 60 cycles the capacity was still 110 Ah/kg.

This material C was inserted into a button type storage battery identical to that shown in FIG. 1. This battery was evaluated electrochemically by the cycle II test described in connection with example 1. The mean discharge voltage was 3.85 V. The capacity per unit mass discharged in cycle II was in the order of 65 Ah/kg after around 20 cycles in the case of the material C.

EXAMPLE 4

The material D in accordance with the invention was prepared as follows. A mixture was made containing manganese oxide $Mn_2O_3$ obtained by thermolysis in air at 700° C. of the "CMD" type product $MnO_2$ obtained chemically and lithium hydroxide $LiOH.(H_2O)$ in proportions such that the molar ratio Li/Mn was equal to 1. The resulting mixture was then ground.

The ground mixture was than heat treated a first time in an inert atmosphere (nitrogen) at 300° C. for two hours and then at 500° C. for one hour in a reducing atmosphere (nitrogen+10% hydrogen saturated with steam) and finally at 500° C. for two hours in an inert atmosphere (nitrogen). The treated mixture was ground again.

Finally the mixture was heat treated a second time at 700° C. for two hours in a reducing atmosphere.

Figure 9:
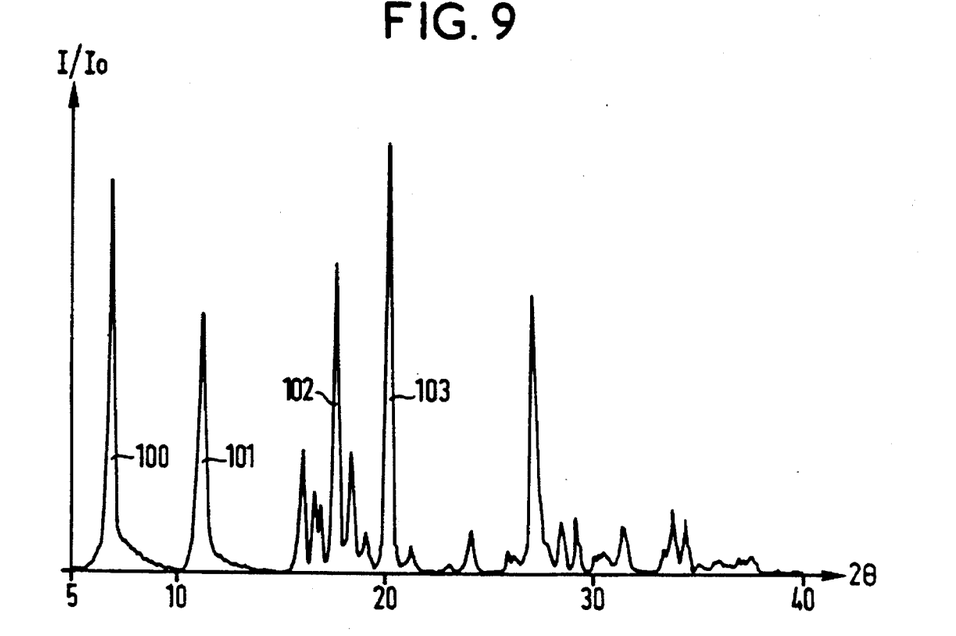
FIG. 9 shows the X-ray diffraction diagram of a substance D in accordance with the invention for a further preparation method.

FIG. 9 shows the diffraction diagram of the material D obtained. The first most intense peaks were:

|  | peak 100 | peak 101 | peak 102 | peak 103 |
| --- | --- | --- | --- | --- |
| d (nm) | 0.580 | 0.360 | 0.230 | 0.201 |
| $I/I_0$ (%) | 91 | 61 | 72 | 100 |
| [hkl] | [010] | [011] | [200] | [021] |

The lattice parameters of the stoichiometric substance were:

a=0.4592 nm, b=0.5768 nm, c=0.2812 nm

Chemical analysis of the material D gave the following results:

composition:7.38% by weight lithium and 57.9% by weight manganese, oxidation of the manganese:3.0, molecular ratio Li/Mn:1.

The formula of this substance was therefore: $LiMnO_{2.00}$.

Figure 10:
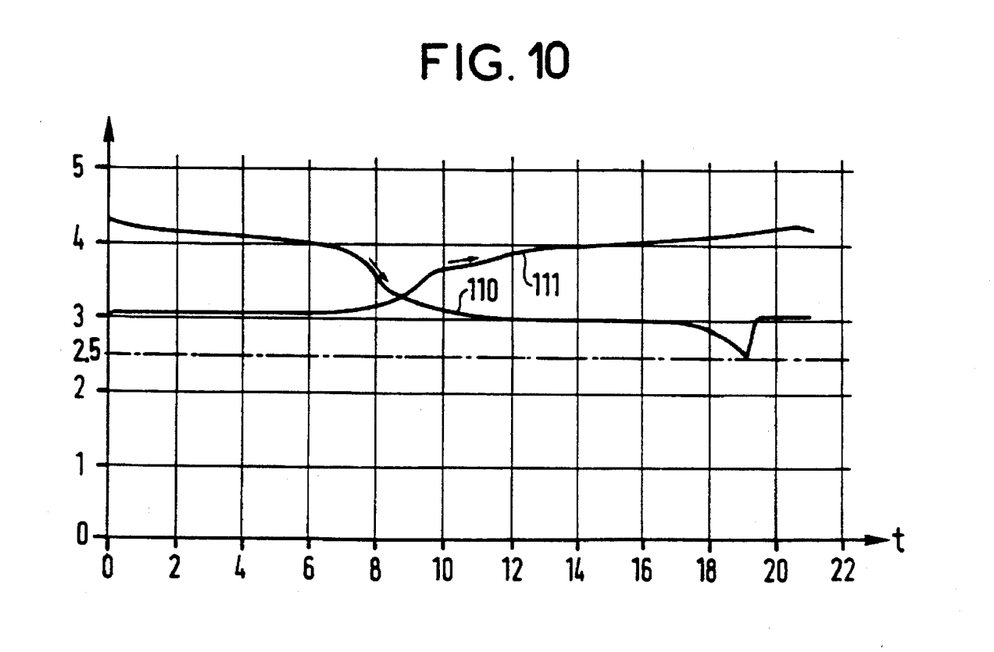
FIG. 10 shows charge and discharge curves for a cell in accordance with the invention containing a substance D whose diagram is shown in FIG. 9 with the voltage V in volts plotted on the ordinate as a function of time in hours plotted on the abscissa.

This material D was inserted into a button type storage battery identical to that shown in FIG. 1. This battery was evaluated electrochemically by the cycle I test described in connection with example 1. FIG. 10 shows a charge cycle 110 and a discharge cycle 111 of this battery. 192 Ah/kg were charged during the first charge. The capacity per unit mass in cycle I was in the order of 165 Ah/kg after around 20 cycles and after more than 60 cycles the capacity was still 165 Ah/kg in the case of the material D.

EXAMPLE 5

The material E in accordance with the invention was prepared in the same way as the material B described in connection with Example 2. The first most intense peaks of the diffraction diagram were:

| d (nm) | 0.58 | 0.363 | 0.231 | 0.202 |
| --- | --- | --- | --- | --- |
| $I/I_0$ (%) | 89 | 48 | 68 | 100 |
| [hkl] | [010] | [110] | [200] | [021] |

Chemical analysis of the material E gave the following results:

composition:7.29% by weight lithium and 59% by weight manganese, molecular ratio Li/Mn:0.98.

The material E was inserted into a button type storage battery identical to that shown in FIG. 1. This battery was evaluated electrochemically by the cycle I test described in connection with example 1. 198 Ah/kg were charged during the first charge. The capacity per unit mass discharged in cycle I was in the order of 170 Ah/kg after around 20 cycles, i.e. a surplus capacity of 28 Ah/kg (14%) on the first charge. After more than 60 cycles the capacity was still 170 Ah/kg in the case of the material E.

The material E was then inserted into a button type storage battery identical to that shown in FIG. 1. This battery was evaluated electrochemically by the cycle II test described in connection with Example 1. The capacity per unit mass discharged in cycle II was in the order of 85 Ah/kg after around 20 cycles, i.e. a surplus capacity of 113 Ah/kg (57%) on the first charge.

The results of the cycling tests described above are summarized in the table below.

| cycle volts | anode | 1st charge (Ah/kg) | later cycles (Ah/kg) | surplus (%) |
| --- | --- | --- | --- | --- |
| 4.3–2.5 | Li | 198 | 170 | 14 |
| 4.3–3.0 | Li | 198 | 85 | 57 |

EXAMPLE 6

The material E was inserted into a button type storage battery similar to that shown in FIG. 1, but containing a graphite type carbon anode with a 20% capacity irreversibility on the first cycle. This battery was evaluated electrochemically by the cycle I test described in connection with example 1. 198 Ah/kg were charged during the first charge. The capacity per unit mass discharged in cycle I was in the order of 158 Ah/kg after around 20 cycles.

| cycle volts | anode | 1st charge (Ah/kg) | later cycles (Ah/kg) | loss (%) |
| --- | --- | --- | --- | --- |
| 4.3–2.5 | graphite | 198 | 158 | 20 |

EXAMPLE 7

The material E was inserted into a button type storage battery similar to that shown in FIG. 1, but containing a coke type carbon anode with a 50% capacity irreversibility on the first cycle. This battery was evaluated electrochemically by the cycle I test described in connection with example 1. 198 Ah/kg were charged during the first charge. The capacity per unit mass discharged in cycle I was in the order of 99 Ah/kg after around 20 cycles.

| cycle volts | anode | 1st charge (Ah/kg) | later cycles (Ah/kg) | loss (%) |
|---|---|---|---|---|
| 4.3–2.5 | coke | 198 | 99 | 50 |

Of course the present invention is not limited to the embodiments described but without departing from the scope of the invention can be varied in many ways that will be evident to the man skilled in the art. Specifically the present invention applies to any type of cell, for example prismatic, cylindrical, and button type cells.

We claim:

1. Rechargeable lithium cell having an anode selected from lithium and alloys of lithium, a cathode, and an electrolyte constituted by a solution of a lithium salt in a non-aqueous solvent, wherein the material of said cathode includes at least one substance which is a yellow-green single-phase oxide of lithium and manganese with an orthorhombic crystal structure with the following lattice parameters: $a=0.459\pm0.004$ nm, $b=0.577\pm0.004$ nm and $c=0.281\pm0.003$ nm and containing lithium ions in a molar ratio of Li/Mn such that $0.85 \leq Li/Mn \leq 1.10$, and after a first charge said substance is discharged in two stages of which the higher of the two stages is at a mean voltage greater than 3.5 volts relative to the lithium.

2. Cell according to claim 1, wherein, after a first cycle said substance has a diffraction diagram whose most intense lines are $0.48\pm0.01$ nm, $0.25\pm0.01$ nm, $0.20\pm0.01$ nm and $0.15\pm0.01$ nm, said first cycle comprising a charge, followed by a discharge.

3. Cell according to claim 1, wherein said lithium salt is selected from the group consisting of lithium perchlorate, lithium hexafluoroarsenate, lithium hexafluorophosphate, lithium tetrafluoroborate, lithium trifluoromethanesulfonate, lithium trifluoromethanesulfonimide and lithium trifluoromethanesulfonemethide and mixtures thereof.

4. Cell according to claim 1, wherein said non-aqueous solvent is an organic solvent containing a mixture of ethers and/or esters, said esters selected from the group consisting of propylene, ethylene, butylene, diethyl and dimethyl carbonates and mixtures thereof.

5. Method of manufacturing a cell according to claim 1, wherein the material of said cathode is obtained as follows:

a mixture is prepared containing an oxide of manganese and lithium hydroxide $LiOH.(H_2O)$ in a molar ratio Li/Mn such that $0.85 \leq Li/Mn \leq 1.10$, said mixture is then heat treated in a non-oxidizing atmosphere with a progressive temperature increase to a maximum value between 500° C. and 900° C., and said cathode is made as follows:

said material is mixed with a conductive material and a binder selected from the group consisting of polyethylene, its copolymers and its derivatives, said mixture is associated with a current collector and said cathode is inserted into said cell.

6. Method according to claim 5 wherein said heat treatment is carried out in an inert atmosphere at 300° C. for two hours and then at 500° C. for three hours and finally at 700° C. for five hours.

7. Method according to claim 5, wherein said heat treatment is carried out in an inert atmosphere at 300° C. for two hours and then at 500° C. for three hours and finally at 700° C. for two hours in a reducing atmosphere.

8. Method according to claim 5, wherein said heat treatment is carried out in an inert atmosphere at 300° C. for two hours and then at 500° C., initially in a reducing atmosphere for one hour then in an inert atmosphere for two hours, and finally in a reducing atmosphere at 700° C. for two hours.

9. Rechargeable lithium cell having an anode material selected from the group consisting of a carbon- and lithium-containing substance and a carbon-containing substance into which lithium can be inserted, a cathode and an electrolyte constituted by a solution of a lithium salt in a non-aqueous solvent, wherein the material of said cathode includes at least one substance which is a yellow-green single-phase oxide of lithium and manganese with an orthorhombic crystal structure with the following lattice parameters: $a=0.459\pm0.004$ nm, $b=0.577\pm0.004$ nm and $c=0.281\pm0.003$ nm and containing lithium ions in a molar ratio of Li/Mn such that $0.85 \leq Li/Mn \leq 1.10$, and after a first charge said substance is discharged in two stages of which the higher of the two stages is at a mean voltage greater than 3.5 volts relative to the lithium and initially contains an initial lithium quantity, wherein the initial lithium quantity is greater than a later lithium quantity which is inserted and removed reversibly in subsequent cycles, wherein the initial lithium content may be removed completely during the first charge.

* * * * *